(12) United States Patent
Fan

(10) Patent No.: US 6,439,331 B1
(45) Date of Patent: Aug. 27, 2002

(54) CHASSIS OF AN ELECTRIC WALK-SUBSTITUTING CAR

(76) Inventor: Ju-Yu Fan, 2F, No. 16, Lane 27, Shui Yuan Road, Chung Cheng District, Taipei (TW)

(*) Notice: Subject to any disclaimer, the term of this patent is extended or adjusted under 35 U.S.C. 154(b) by 0 days.

(21) Appl. No.: 09/641,938

(22) Filed: Aug. 21, 2000

(51) Int. Cl.⁷ ................................................ B60K 1/00
(52) U.S. Cl. ...................... 180/208; 180/65.1; 180/907
(58) Field of Search .......................... 180/59, 60, 65.1, 180/208, 210, 311, 907, 908; 280/124.109

(56) References Cited

U.S. PATENT DOCUMENTS

| | | | | |
|---|---|---|---|---|
| 4,452,327 A | * | 6/1984 | Mowat et al. | 180/907 |
| 5,036,938 A | * | 8/1991 | Blount et al. | 180/907 |
| 5,074,372 A | * | 12/1991 | Schepis | 180/208 |
| 5,150,762 A | * | 9/1992 | Stegeman et al. | 180/65.1 |
| 5,154,251 A | * | 10/1992 | Fought | 180/208 |
| 5,941,327 A | * | 8/1999 | Wu | 180/65.1 |
| 6,129,165 A | * | 10/2000 | Schaffner et al. | 180/65.1 |
| 6,170,592 B1 | * | 1/2001 | Wu | 180/208 |

* cited by examiner

Primary Examiner—Brian L. Johnson
Assistant Examiner—Christopher Bottorff
(74) Attorney, Agent, or Firm—Rosenberg, Klein & Lee

(57) ABSTRACT

A chassis apparatus for an electric cart is provided. The chassis apparatus includes a front chassis, a middle chassis, and a rear chassis coupled together. The front chassis includes a pair of longitudinally extended support rods, a fixed rod extending between the support rods, a connect rod extending vertically upward from the fixed rod, and a combining plate having a substantially U-shaped sectional contour projecting from an upper end portion of the connect rod. The middle chassis includes a laterally extended middle rod, a combine rod extending vertically upward from the middle rod to engage the connect rod and combining plate of the front chassis, a support plate extending along the middle rod to define a channel that receives at least a portion of the front chassis fix rod, and a laterally extended middle strip disposed in longitudinally offset manner relative to the middle rod. The rear chassis includes a pair of side rods extending longitudinally in substantially parallel manner, and at least a pair of resilient members respectively captured between connect members projecting from the side rods and combine members projecting from the middle strip for biasing the side rods relative to the middle strip.

2 Claims, 9 Drawing Sheets

CHASSIS OF AN ELECTRIC WALK-SUBSTITUTING CAR

BACKGROUND OF THE INVENTION

This invention relates to a chassis of an electric walk-substituting car, particularly to one having a front chassis and a rear chassis assembled together and their connecting condition more stable than conventional ones.

Electric walk-substituting car is classified into two kinds, one for medical care and the other for leisure activity. Those for medical care are advantageous for transporting patients, generally having a chassis consisting of a front chassis and a rear chassis assembled together, with its weight being not over 20 Kg. And this regulation is more rigorous in Europe and in America than other regions.

A known conventional chassis of an electric walk-substituting car shown in FIGS. 8 and 9 includes a front chassis 10 and a rear chassis 20 separable from each other. The front chassis 10 has a support post 101, a fitting block 102 fixed near a lower end of a rear side, an insert hole 103 bored in the fitting block 102 and a insert rod 104 respectively provided at two sides of the fitting block 102. Further, a lateral rod 105 is fixed under the support post 101, having two ends fixed with a first hook 106 with a central hook rod 107 on a rear side.

The rear chassis 20 has a front lateral rod 201, which has a second hook 202 respectively fixed at two ends, and two insert plates 204 in a middle section, with a insert groove 205 formed in each insert plate 204. Further, a bottom plate 30 is welded on upper ends of the two insert plates 204, and a cylinder 302 is welded on the bottom plate 30 and has an lower portion 305 of a pull rod 303 fitted in its interior. A pull handle 304 is fixed on an upper end of the pull rod 303, and a lower end 306 of the pull rod 303 protrudes out the lower end of the cylinder 302. Further, a coil spring 307 fits around the lower portion 305, having an upper end pushing an upper end of the cylinder 302 and a lower end resting on an upper end of the lower end 306 to let the pull rod 303 move up and down. Then the front and the rear chassis 10 and 20 can be assembled easily by means of the lateral rods 105 and 201 hooking each other.

However, the first known conventional chassis of an electric walk-substituting car have the front and the rear chassis assembled together by only three points, unstable and not ideal in assembly of the front and the rear chassis.

Next, a second known conventional chassis of an electric car disclosed in U.S. Pat. No. 5,941,327 shown in FIG. 10 includes a chassis consisting of a first chassis 40 and a second chassis 50 separable from each other, with each chassis provided with a rotatable wheel 401, 501.

The second conventional electric car further has a steering wheel 60 rotatably mounted on the first chassis 40, connected to the wheel 401 to control it to turn.

An adjustable chair is also disposed on the first chassis 40 in the second conventional electric car.

Further, the first chassis 40 has a post 402 with two ears 403 fixed on an upper end and the second chassis 50 has a connect rod 502 with a hole 503 for an insert pin 80 to protrude and also through the two ears 403 and the hole 503. The second chassis 50 further has a L-shaped fix means 504 respectively fixed at two front sides for two ends of a pivotal rod 404 of the first chassis 40 to fit in so that the front and the rear chassis 40 and 50 are assembled together.

But the second conventional electric car has a disadvantage that the front and the rear chassis are also assembled together only with three points, unstable, not ideal as the first conventional one.

SUMMARY OF THE INVENTION

The objective of the invention is to offer a chassis of an electric walk-substituting car, which has a front chassis provided with a vertical connect rod and a lateral position rod fixed under the connect rod and having two ends connected to a front portion of the front chassis. A rear chassis is provided to assemble with the front chassis, having a vertical combine rod for a chair to combine with, a combine plate in a front portion, and two flat plates respectively provided at two sides of the combine rod for placing two batteries thereon. A front lateral rod and a rear lateral rod are fixed under the two flat plates and define a hollow aperture between them for the position rod of the first chassis to fit in. And the vertical connect rod fits in a U-shaped connector fixed on an upper end of the combine rod of the second chassis. When a user sits on the chair of the car, the weight of the user and the batteries press down to prevent the front chassis and the rear chassis from separating from each other.

BRIEF DESCRIPTION OF THE DRAWINGS

This invention will be better understood by referring to the accompanying drawings, wherein.

DESCRIPTION OF THE PREFERRED EMBODIMENTS

Figure 1:
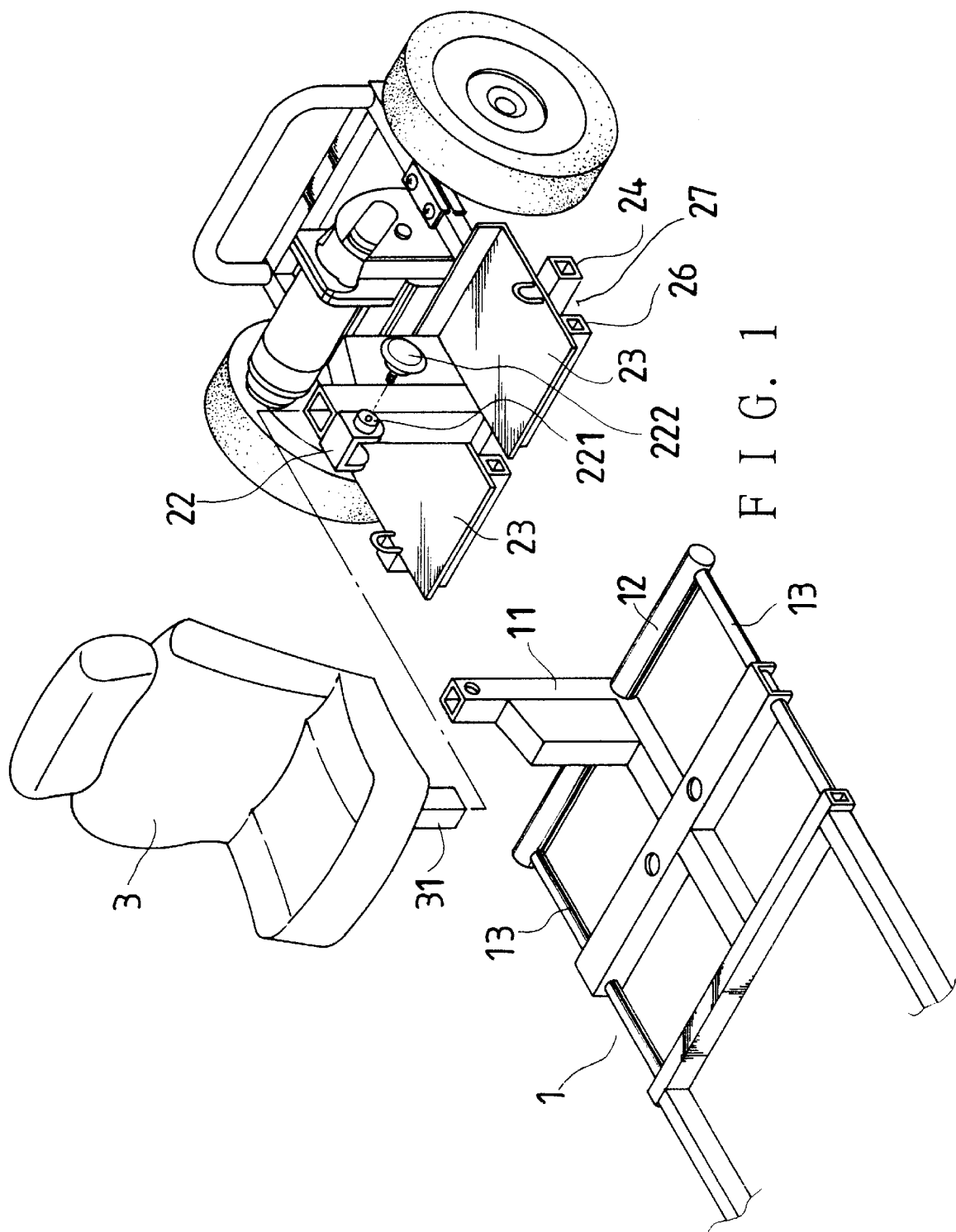
FIG. 1 is an exploded perspective view of a first embodiment of an electrical walk-substituting car of the present invention.
Figure 2:
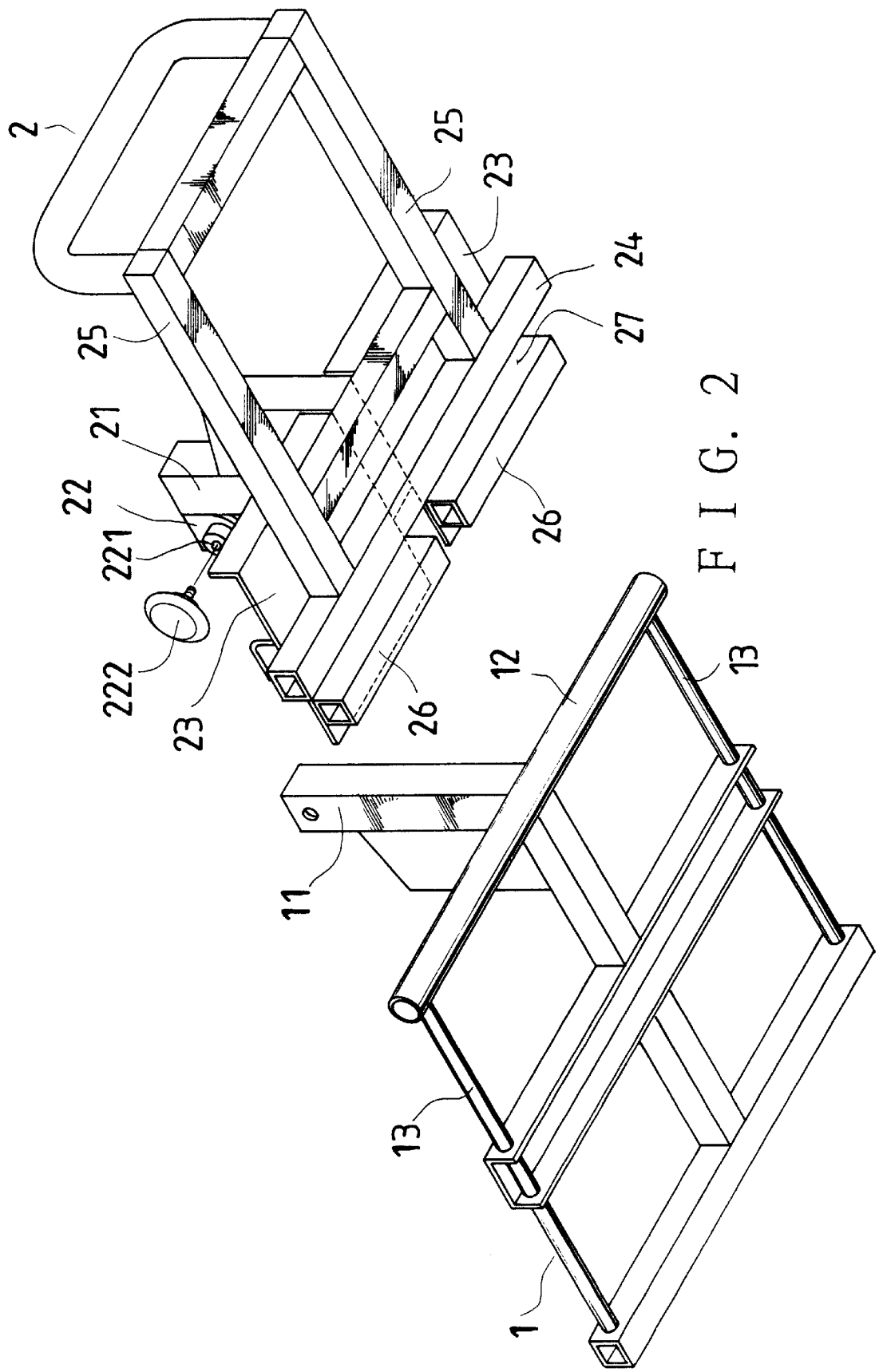
FIG. 2 is anther exploded view of the first embodiment of an electrical walk-substituting car of the present invention.

A first embodiment of a chassis of an electric walk-substituting car of the present invention, as shown in FIGS. 1 and 2, includes a front chassis 1 and a rear chassis 2 combined together.

The front chassis 1 comprises a connect rod 11, a position rod 12 and a support rod 13. The connect rod 11 is at a rear side; the position rod 12 is connected to a lower end of the connect rod 11, and the support rod 13 is respectively located at two sides of the front chassis 1 and connected to two ends of the position rod 12.

The rear chassis 2 has a hollow combine rod 21 vertically provided at a front side for a support rod 31 of a chair 3 to fit tightly in. A combine plate 22 is connected to the front upper side of the hollow combine rod 21 for a connect rod 11 of the front chassis 1 to fit in. The combine plate 22 has a side wall provided with a threaded means 221 for a screw button 222 to screw in and pass through the wall of the connect rod 11. The hollow combine rod 21 has a plate 23 respectively at two sides of the lower end for placing a battery thereon. Further, a rear rod 24 is provided under an intermediate portion of the two plates 23, having two end sides vertically connected to two support rods 25 of the rear chassis 2. A hollow front rod 26 is respectively provided under a front end of the two plates 23 and separated from the rear rod 24 with a proper distance to form an insert aperture 27 for the position rod 12 of the front chassis 1 to fit in.

Figure 3:
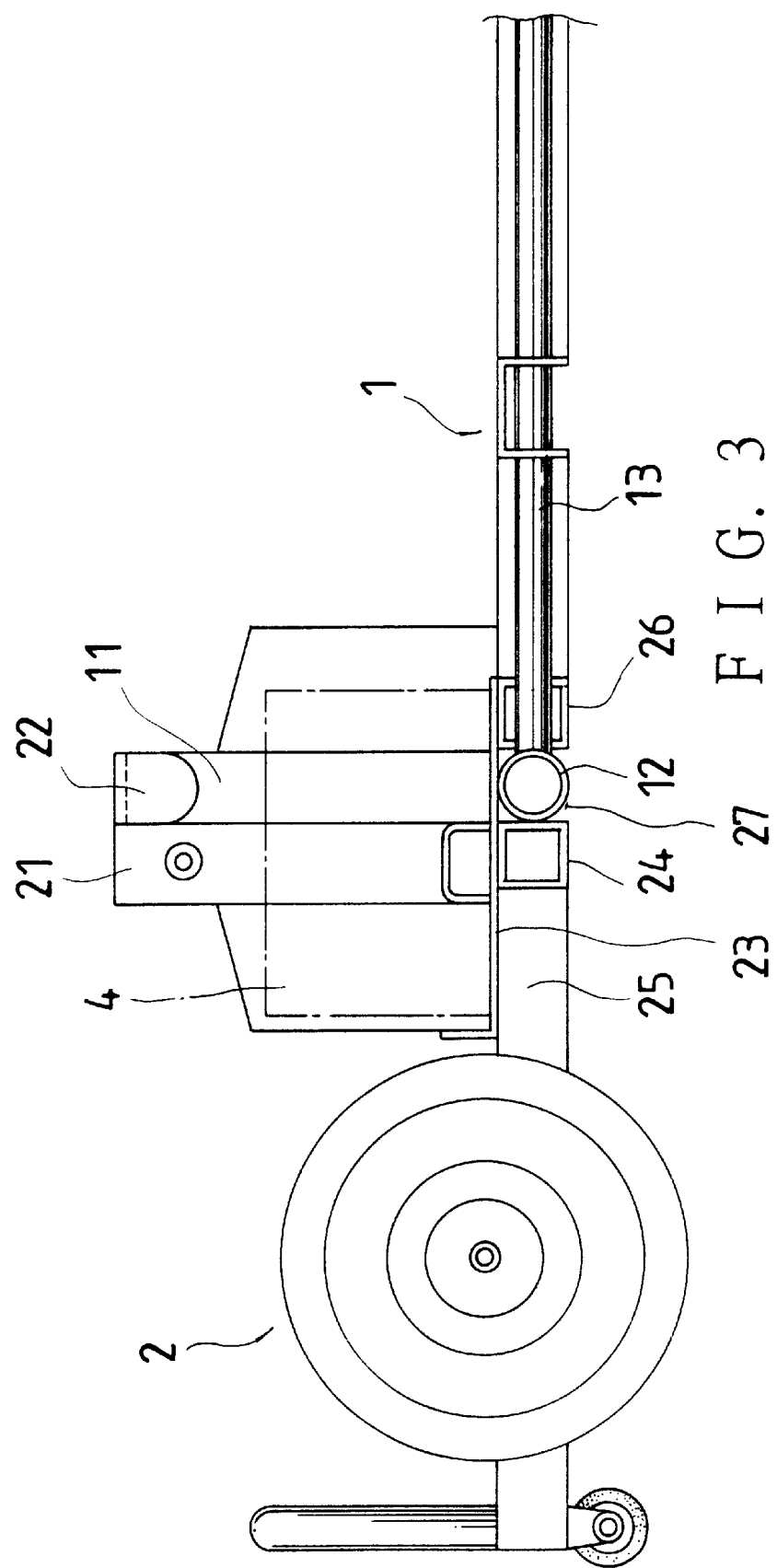
FIG. 3 is a side view of a front and a rear chassis assembled together in the first embodiment of the present invention.
Figure 4:
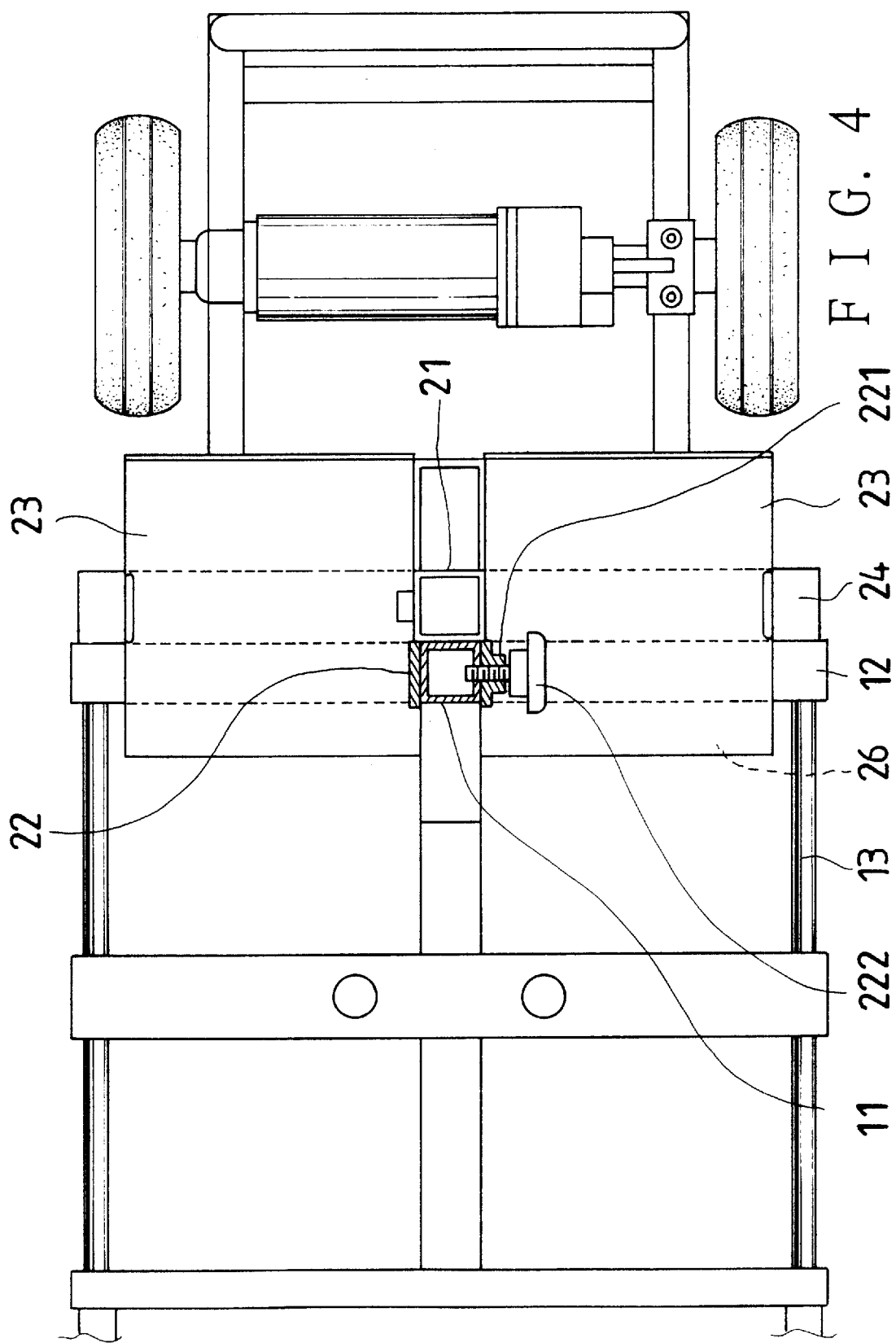
FIG. 4 is an upper view of the front and the rear chassis assembled together in the first embodiment of the present invention.

In assembling, firstly, the position rod 12 of the front chassis 1 is placed in the inert aperture 27 between the front and the rear rod 26 and 24, as shown in FIG. 3. Then the connect rod 11 of the front chassis I is inserted in the combine plate 22 of the rear chassis 2, with the screw button 222 screwing the threaded means 221 of the combine plate 22 and passing through the wall of the connect rod 11, as shown in FIG. 4. Thus, the front and the rear chassis 1 and 2 are assembled together stably, with one side of the connect rod 11 and one side of the combine rod 21 contacting against each other, as shown in FIG. 3.

In using, the chair 3 is combined on the rear chassis 2 for a user to sit on, and the rear chassis 2 may be naturally pressed down by the weight of the user and the batteries 4, forcing the connect rod 11 and the combine rod 21 more tightly contact against each other and the position rod 12 surely fit in the insert aperture 27. Therefore, the front and the rear chassis 2 can not easily separate from each other, even if the screw button 222 is loose, keeping the user safe on the car.

The first embodiment of the electric walk-substituting device has the following advantages.
1. The position rod of the front chassis inserts in the insert aperture formed between the front rod and the rear rod of the rear chassis, forming a line contact to secure the whole chassis comparatively stable.
2. The connect rod of the front chassis and the combine rod of the rear chassis contact with each after the front and the rear chassis are assembled together, and the weight of a user and the battery naturally press down the rear chassis to tightly contact with the front chassis so that the front and the rear chassis may not easily separate from each other.

Figure 5:
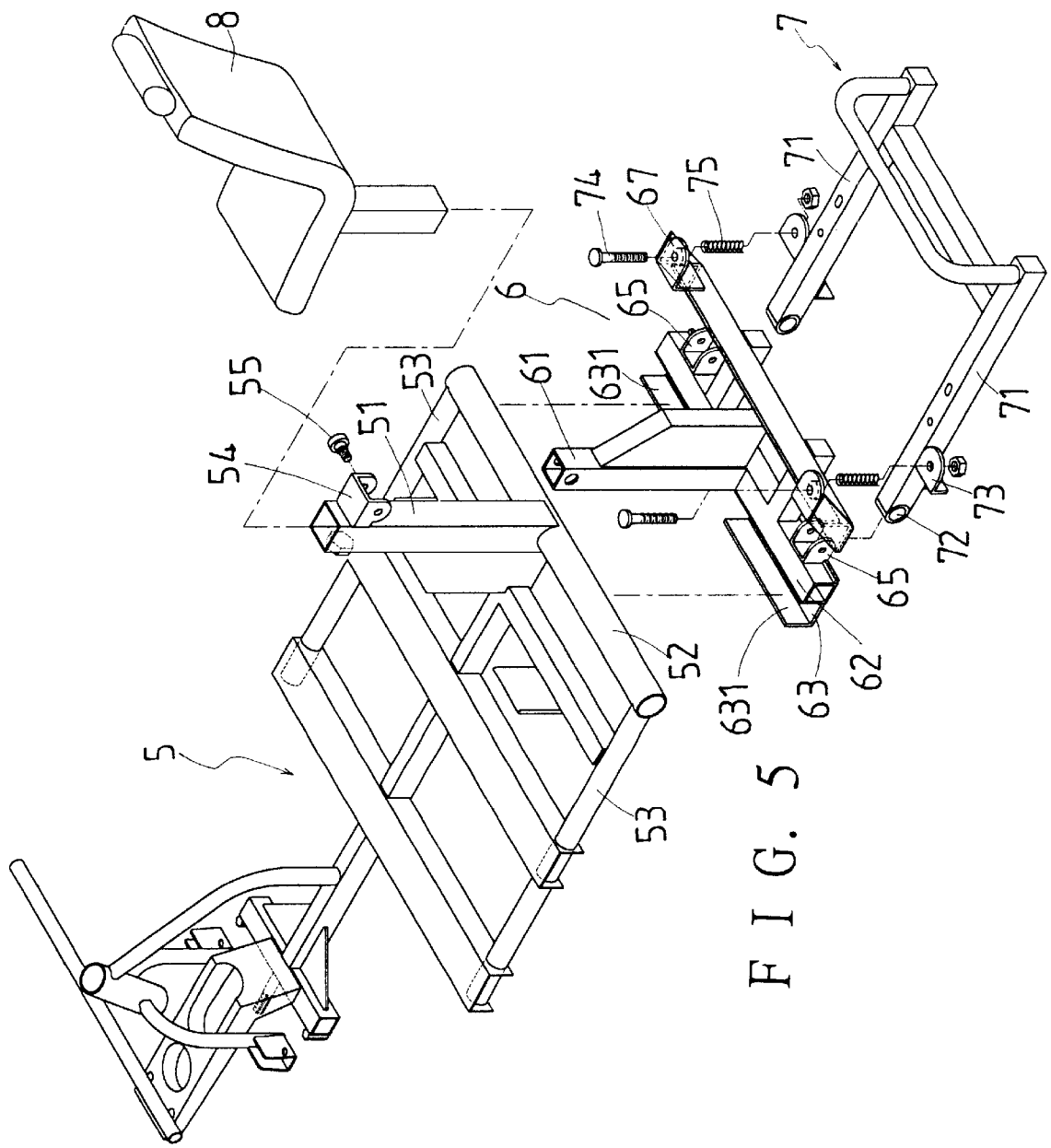
FIG. 5 is an exploded perspective view of a second embodiment of a chassis of an electric walk-substituting car of the present invention.

Next, a second embodiment of a chassis of walk-substituting car is shown in FIG. 5, includes a front chassis 5, a middle chassis 6 and a rear chassis 7 assembled together.

The front chassis 5 has a vertical connect rod 51 provided at a rear side and a fix rod 52 fixed laterally under the lower end of the vertical connect rod 51, which has two ends respectively connected to a support rod 53 extending lengthwise forward. Further, the connect rod 51 has an inverted U-shape combine plate 54 fixed on its upper rear side, and the chair 8 is combined on the upper end of the connect rod 51, with two batteries 9 placed at two sides of the connect rod 51.

The middle chassis 6 has a vertical combine rod 61 and a lateral rod 62 located under the combine rod 61. The lateral rod 62 has an L-shaped plate 63 respectively at two sides in front of the lateral rod 62. Each L-shaped plate 63 has a vertical portion 631 defining an insert aperture 64 with the lateral rod 62 for the fix rod 52 of the front chassis 5 to fit therein. A pivot connector 65 is respectively fixed at two sides of the rear wall of the lateral rod 62. A lateral elongate strip 66 is provided at the rear side of the middle chassis 6, and a combine means 67 respectively fixed at two ends of the strip 66.

The rear chassis 7 has a side rod 71 respectively extending lengthwise parallel at two sides, and each side rod 71 has a pivot hole 72 formed in a front side to be pivotally connected to each pivot connector 65 of the middle chassis 6, a connect means 73 respectively fixed on an outer side of each side rod 71 and aligned to each other to be connected to each combine means 67 of the middle chassis 6 with a bolt and nut 74 fitted around by a coil spring 75.

Figure 6:
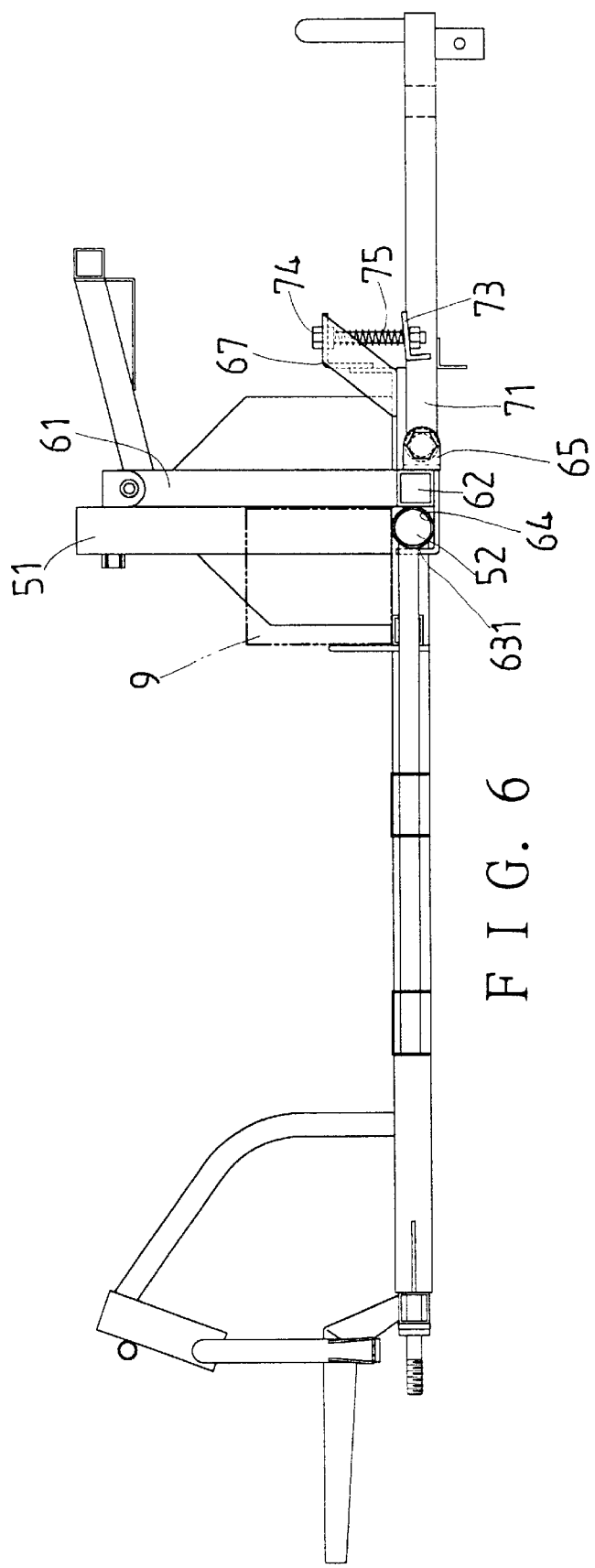
FIG. 6 is a side view of the second embodiment of a chassis of an electric walk-substituting car of the present invention.
Figure 7:
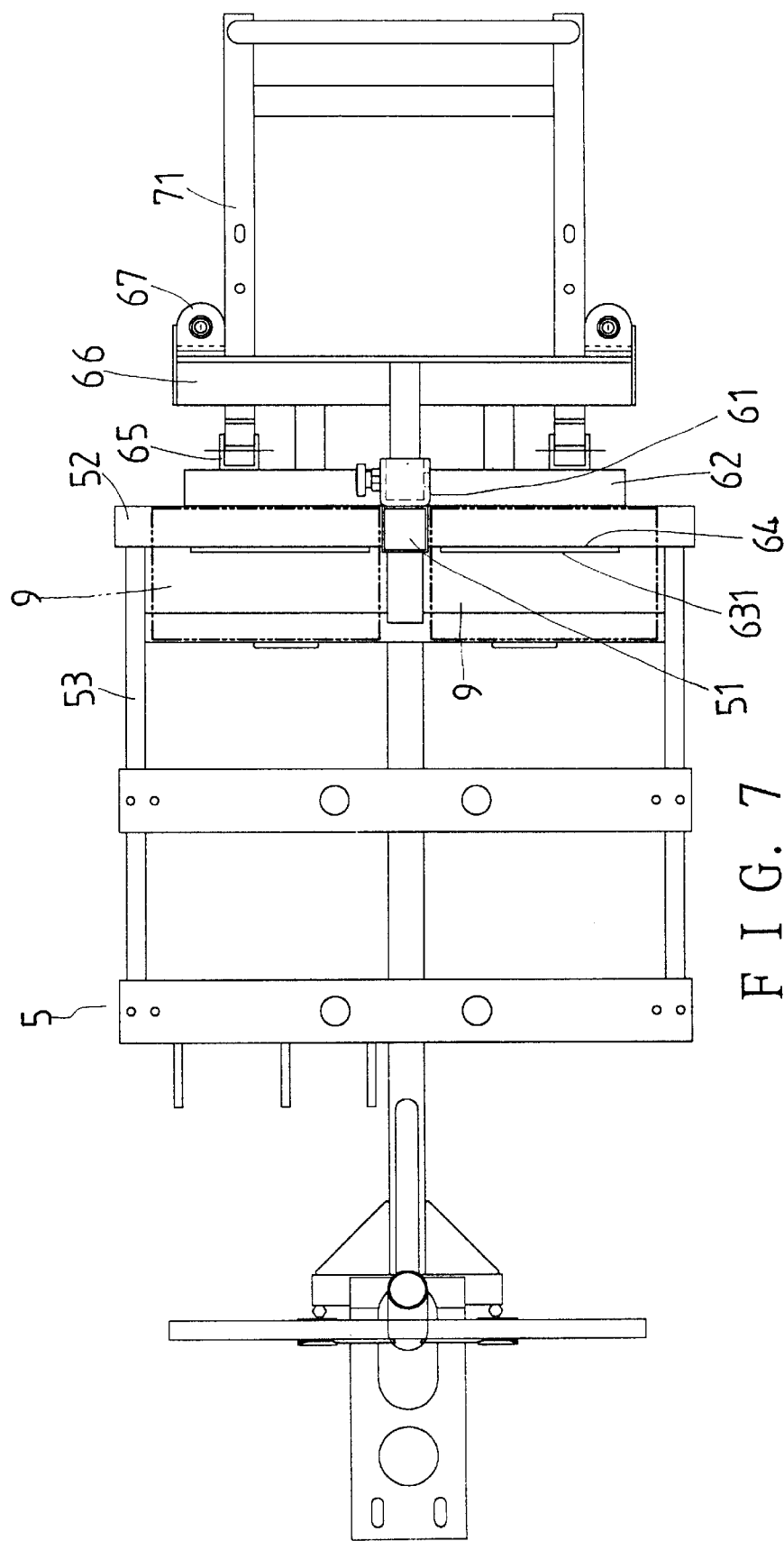
FIG. 7 is an upper view of the second embodiment of a chassis of an electric walk-substituting car of the present invention.
Figures 8, 9:
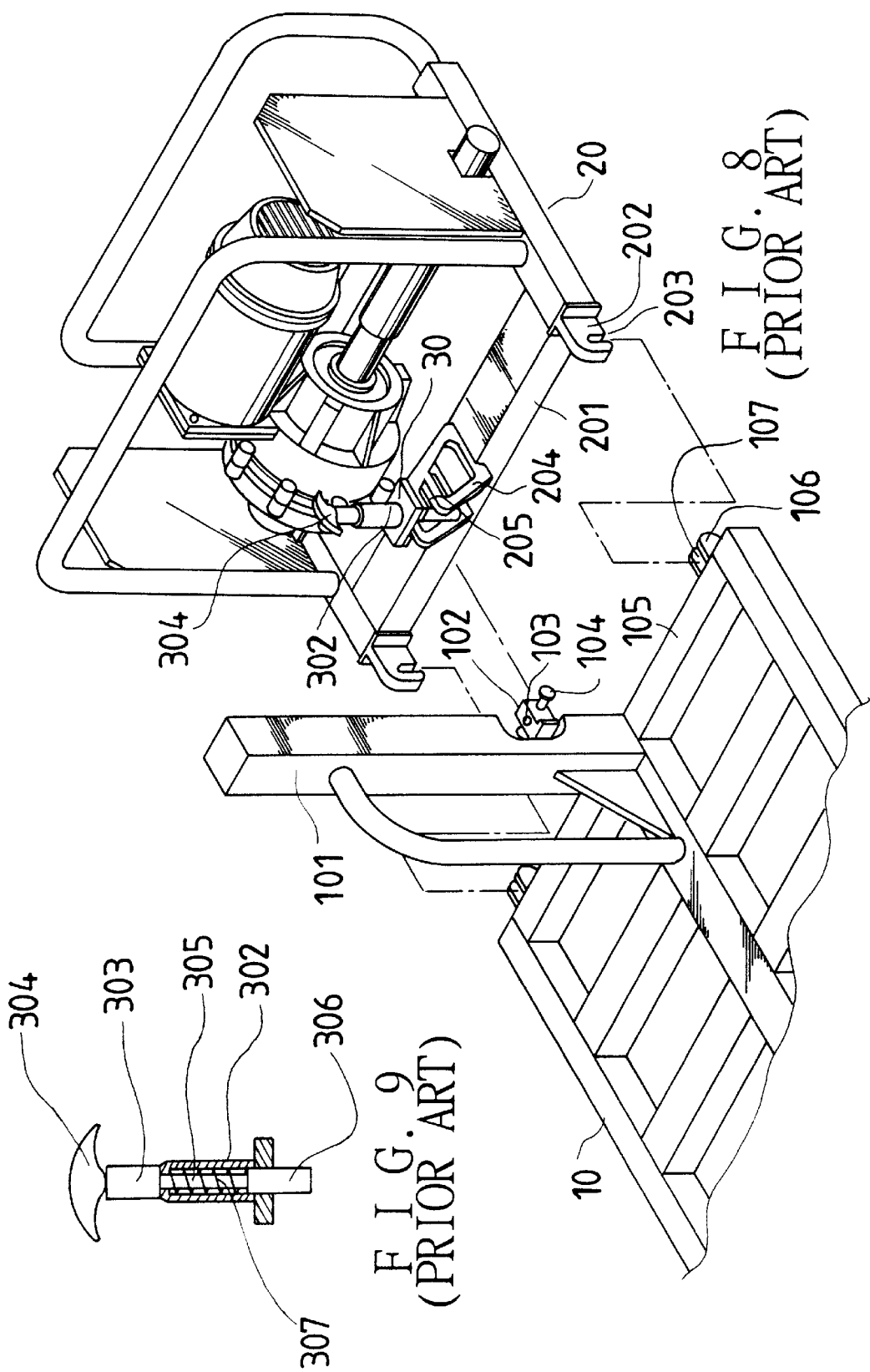
FIG. 8 is an exploded perspective view of a chassis of a first conventional car.
FIG. 9 is a fragmentary cross-sectional view of a cylinder disposed on a bottom plate of the first conventional car.
Figure 10:
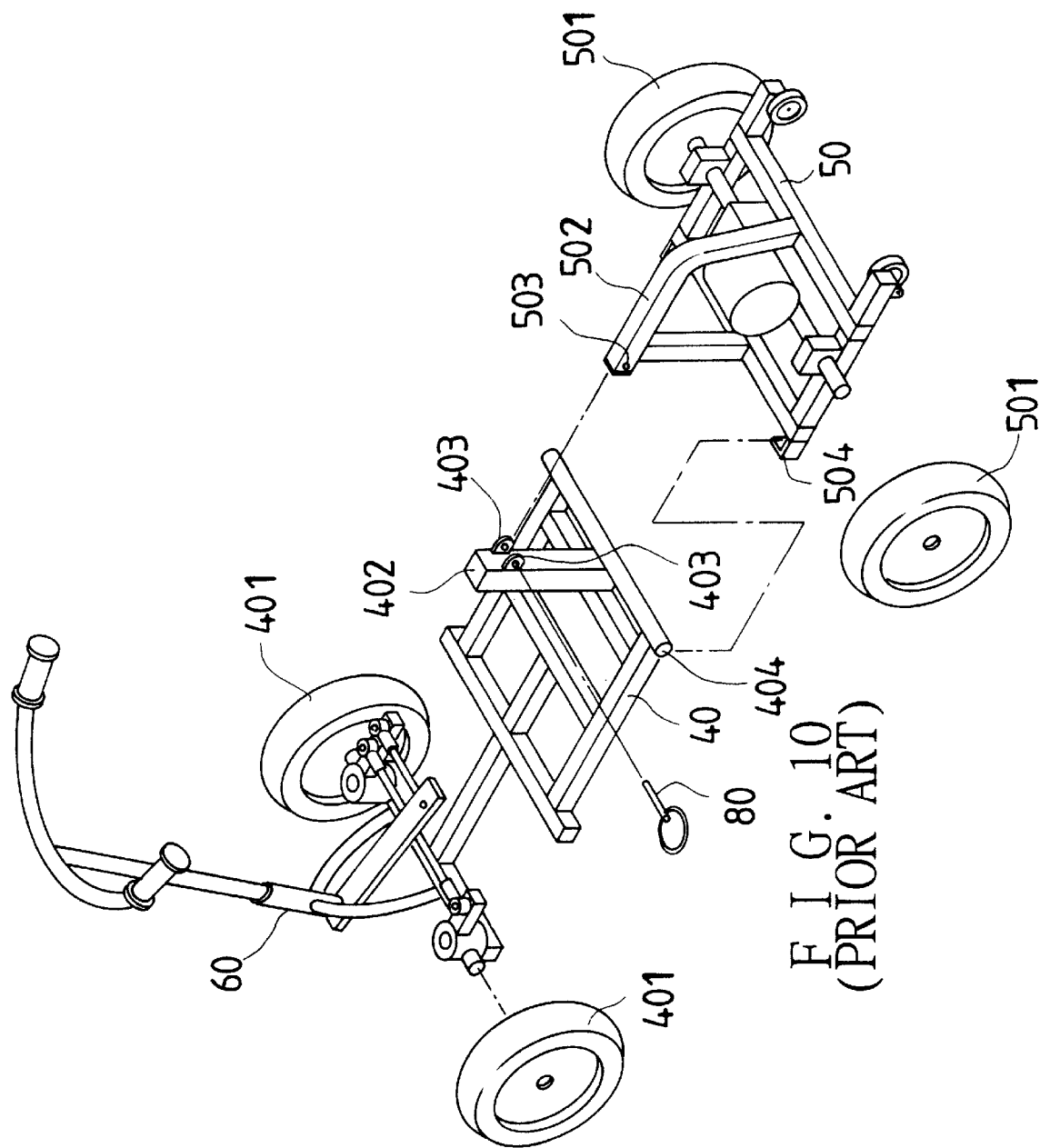
FIG. 10 is an exploded perspective view of a chassis of a second conventional car.

In assembling, referring to FIGS. 6 and 7, firstly, the fix rod 52 of the front chassis 5 is inserted in the inert aperture 64 of the middle chassis 6, then the upper end of the combine rod 61 is inserted in the combine plate 54 on the upper end of the connect rod 51 and then screwed together with the screw button 55, combining the front chassis 5 and the middle chassis 6. Next, the pivot holes 72 of the two side rods 71 of the rear chassis are fitted in the two pivot connectors 65 and two pivots 58 are respectably inserted through the pivot holes 72 and the pivot connectors 65 so that the two side rods 71 and the rod 62 are pivotally connected to each other. Lastly, insert the bolts 74 through the combine means 67 and the two connect means 73 of the side rods 71 of the rear chassis 7 and screw the bolts 74 with the nuts 74, with two coil springs 75 respectively fitted around the two bolts 74, finishing assembly of the front, the middle and the rear chassis together.

In using, a user sits on the chair 8 combined on the front chassis 5, which is then pressed down by the weight of the user and the batteries 9, naturally forcing the connect rod 51 and the combine rod 61 contact more tightly with each other and the position rod 52 surely fitting in the insert aperture 64 to secure the front chassis 5 with the middle chassis 6 stabilized. Thus, the front chassis 5 and the middle chassis 6 may not separate easily from each other, keeping the user safe in riding the car. In addition, the middle chassis 6 and the rear chassis 7 are assembled together with the bolts and nuts 74 fitted around with the coil springs 75, which produce elasticity to absorb vibration as to make the car comfortable to ride on.

The second embodiment also has the following advantages.
1. The front chassis and the middle chassis are assembled together comparatively stabilized by means of the fix rod of the front chassis fitting in the insert aperture with linear contact.
2. The front chassis and the middle chassis may not easily separate from each other owing to the connect rod of the front chassis contacting tightly with the combine rod of the middle chassis, especially in case a user sits on the chair.
3. A user may feel comfortable in riding the car because of the coil springs fitted around the bolts assembling the middle chassis and the rear chassis and functioning as a shock-absorbing structure.

What is claimed is:
1. A chassis apparatus for an electric cart comprising:
 (a) a front chassis including:
  a pair of longitudinally extended support rods;
  a fix rod extending between said support rods;
  a connect rod extending vertically upward from an intermediate portion of said fix rod, said connect rod having an upper end portion for telescopically engaging a chair support member; and, a combining plate projecting transversely from said upper end portion of said connect rod, said combining plate having a substantially U-shaped sectional contour;

(b) a middle chassis coupled to said front chassis, said middle chassis including:

a laterally extended middle rod, said middle rod having at least a pair of substantially U-shaped pivot connectors projecting therefrom;

a combine rod extending vertically upward from an intermediate portion of said middle rod to engage said combining plate of said front chassis, said combine rod being disposed in flush contact with said connect rod of said front chassis;

a support plate extending along at least a portion of said middle rod to project transversely therefrom, said support plate having a substantially L-shaped sectional contour to describe a channel defining an insert aperture, said channel receiving therein at least a portion of said fix rod of said front chassis; and, a laterally extended middle strip disposed in longitudinally offset manner relative to said middle rod, said middle strip having at least a pair of combine members projecting therefrom, said combine members being vertically offset from said pivot connectors of said middle rod; and, (c) a rear chassis coupled to said middle chassis, said rear chassis including:

a pair of side rods extending longitudinally in substantially parallel manner, said side rods each having a free pivot end pivotally coupled to one said pivot connector of said middle rod, said side rods each having at least one connect member projecting from an intermediate portion thereof; and, at least a pair of resilient members respectively captured between said connect members of said side rods and said combine members of said middle strip for resiliently biasing said side rods relative to said middle strip.

2. The chassis apparatus as recited in claim 1 wherein said combine rod of said middle chassis engages said combining plate of said front chassis in releasably fastened manner.

* * * * *